United States Patent
Ziada et al.

(10) Patent No.: US 11,061,381 B1
(45) Date of Patent: Jul. 13, 2021

(54) ENCODER BASED MACHINING QUALITY PROGNOSTICS

(71) Applicant: Ford Global Technologies, LLC, Dearborn, MI (US)

(72) Inventors: Youssef Ziada, Milford, MI (US); Ethan Timothy Hughey, Royal Oak, MI (US); Richard Earl Williford, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 16/739,888

(22) Filed: Jan. 10, 2020

(51) Int. Cl.
*G05B 19/4065* (2006.01)

(52) U.S. Cl.
CPC ........ *G05B 19/4065* (2013.01); *G05B 2219/41051* (2013.01)

(58) Field of Classification Search
CPC ...... G05B 19/4065; G05B 2219/41051; G05B 2219/41037; G05B 2219/41001
See application file for complete search history.

(56) References Cited

U.S. PATENT DOCUMENTS

| | | | |
|---|---|---|---|
| 5,895,181 A * | 4/1999 | Ito ............... | B23Q 23/00 409/132 |
| 6,701,212 B2 * | 3/2004 | Shiba ............ | G05B 19/404 700/186 |
| 2008/0319705 A1 * | 12/2008 | Balleisen ...... | G05B 19/4063 702/150 |
| 2018/0169814 A1 * | 6/2018 | Sugiura ......... | H02P 6/28 |

* cited by examiner

*Primary Examiner* — Jennifer Bahls
(74) *Attorney, Agent, or Firm* — Burris Law, PLLC

(57) ABSTRACT

A method of measuring quality in a machining operation of a device includes measuring lost motion for at least one axis of the device during the machining operation, calculating a spindle lag of a spindle of the device during the machining operation, determining a lost motion deviation, determining a spindle lag deviation, and identifying a machining defect based on the lost motion deviation coinciding with the spindle lag deviation.

20 Claims, 5 Drawing Sheets

ENCODER BASED MACHINING QUALITY PROGNOSTICS

FIELD

The present disclosure relates to machining quality prognostics.

BACKGROUND

The statements in this section merely provide background information related to the present disclosure and may not constitute prior art.

When machining parts, quality of the parts is typically determined through periodic quality checks (e.g., measurements) of the parts with gauges or coordinate measuring machines. If a periodic check fails, all parts since the last check must be quarantined and inspected. This process can be expensive and time consuming.

Process monitoring is also used to determine problems during the machining process. Process monitoring typically relies on external sensors such as accelerometers, force sensors, or electrical current sensors to measure baseline process characteristics and then attempts to infer issues based on characteristics such as vibration, force, or electrical current draw of motors. However, in addition to requiring additional hardware (e.g., the external sensors), typical process monitoring can suffer from signal to noise problems for very light cuts or small process errors. For example, detecting non-cleanup conditions in aluminum drilling can be difficult to detect using only typical process monitoring methods. Additionally, typical process monitoring can suffer from non-linear sensitivity for vertical axes since gravity acting on the moving parts can cause the signal responses to be very different between upward, downward, or side to side movements.

The present disclosure addresses these and other issues associated with machining quality monitoring.

SUMMARY

In one form, a method of measuring quality in a machining operation of a device includes measuring lost motion for at least one axis of the device during the machining operation, calculating a spindle lag of a spindle of the device during the machining operation, determining a lost motion deviation, determining a spindle lag deviation, and identifying a machining defect based on the lost motion deviation coinciding with the spindle lag deviation. According to a variety of alternate forms: measuring the lost motion for the at least one axis includes measuring a first linear encoder position, measuring a first rotary encoder position, and calculating a difference between the first linear encoder position and the first rotary encoder position; the method further includes measuring an actual angular position of the spindle, wherein calculating the spindle lag includes comparing a desired angular position of the spindle to the actual angular position of the spindle; the device includes a first motor configured to move the spindle relative to the workpiece along a first axis, and wherein the first linear encoder position is a position of the spindle along the first axis and the first rotary encoder position is an angular position of the first motor; the device includes a first motor configured to move the workpiece relative to the device along a first axis, and wherein the first linear encoder position is a position of the workpiece along the first axis and the first rotary encoder position is an angular position of the first motor; the machining defect is identified if the determined lost motion deviation is greater than a lost motion threshold and the spindle lag deviation is less than a spindle lag threshold; measuring lost motion for the at least one axis includes measuring lost motion for a plurality of axes of the device during the machining operation; the plurality of axes includes an X-axis, a Y-axis, and a Z-axis; the machining operation is a clean-up operation performed on a workpiece; the workpiece is a cast workpiece; the workpiece is aluminum; the machining operation is one of drilling, reaming or milling.

According to another form, a method of measuring quality in a machining operation of a device including a spindle includes performing a machining operation and measuring a first linear encoder position along a first axis during the machining operation. The method further includes measuring a first rotary encoder position of a first motor during the machining operation, the first motor configured to move either the spindle or a workpiece along the first axis, calculating a difference between the first linear encoder position and the first rotary encoder position to determine a first axis lost motion, measuring an actual angular position of the spindle, comparing a desired angular position of the spindle to the actual angular position of the spindle to determine a spindle lag of a spindle, and identifying a machining defect based on a lost motion deviation coinciding with a spindle lag deviation. According to a variety of alternate forms: the first motor is configured to move the spindle relative to the workpiece along the first axis, and wherein the first linear encoder position is a position of the spindle along the first axis; first motor is configured to move the workpiece relative to the device along the first axis, and wherein the first linear encoder position is a position of the workpiece along the first axis; the machining defect is identified if the lost motion deviation is outside a predetermined lost motion range and the spindle lag deviation is outside a predetermined spindle lag range; the machining operation is one of drilling, reaming, or milling.

According to a further form, a machining device includes a spindle, a spindle motor, a first axis motor, and a controller. The spindle is configured to hold one of a tool or a workpiece. The spindle motor is drivingly coupled to the spindle to rotate the spindle about a spindle axis. The first axis motor is drivingly coupled to one of the spindle or a workpiece support and configured to move the one of the spindle or the workpiece support along a first linear axis. The controller is configured to identify a machining defect based on a first axis lost motion and a spindle lag, the first axis lost motion being lost motion along the first linear axis. According to a variety of alternate forms: the machining device further includes a spindle rotary encoder, a first rotary encoder, and a first linear encoder, the spindle rotary encoder is configured to detect a rotational position of the spindle, the first rotary encoder is configured to detect a rotational position of the first axis motor, the first linear encoder is configured to detect a position along the first linear axis of the one of the spindle or the workpiece support, the controller is connected for electrical communication with the spindle rotary encoder, the first rotary encoder, and the first linear encoder, the controller is configured to calculate the first axis lost motion based on signals received from the first rotary encoder and the first linear encoder, the controller is configured to calculate the spindle lag based on an expected rotary position and signals received from the spindle rotary encoder; the first axis lost motion is a difference between the position detected by the first linear encoder and the rotational position detected by the first rotary encoder, and wherein the spindle lag is a difference between the rotational position detected by the spindle rotary encoder and a desired angular position of the spindle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
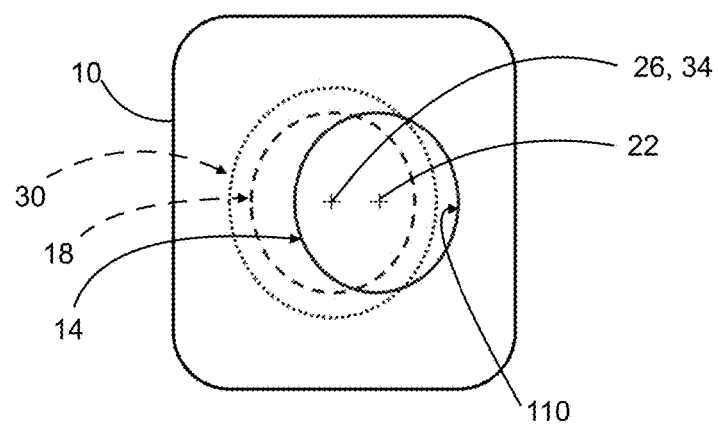
FIG. 1 is a top view of a workpiece illustrating a first example type of non-cleanup condition.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a workpiece 10 is illustrated. In the example provided, the workpiece 10 is a cast aluminum body, though other materials and processes can be used. The workpiece 10 includes a rough feature 14. The rough feature 14 is located at a location on the workpiece 10 that is offset from an intended location. The intended location is illustrated in FIG. 1 by an intended rough feature 18 shown in dashed lines. In the example provided the rough feature 14 and intended rough feature 18 are bores. Accordingly, the rough feature 14 and intended rough feature 18 are also referred to herein as the bore 14 and intended bore 18, respectively. In an alternative configuration, not specifically shown, the rough feature 14 and intended rough feature 18 can be a different types of rough feature besides bores, such as rough and intended rough surfaces, edges, corners, curves, protrusions, etc. In the example provided, the bore 14 has been cast in the workpiece 10, though other rough processing methods can be used (e.g., forging, machining, molding, forming, bending, additive manufacturing).

In the example provided, a center point 22 of the bore 14 is offset from an intended center point 26 of the intended bore 18, as can happen from a core shift of the cast (not shown) for example. In the example provided, the offset is exaggerated for ease of illustration.

A location of an area to be machined is illustrated in dashed lines and by reference number 30 and has a reference point 34. In the example provided, the area to be machined 30 is a bore having a larger diameter than the intended bore 18 and the reference point 34 is coincident with the intended center point 26. The area to be machined 30 is also referred to herein as the tool path 30 or tool location 30 depending on the type of tool (not specifically shown in FIG. 1) used. For example, if the tool used to machine the area to be machined 30 is a drill, reamer, or boring tool, the reference point 34 may be a rotational axis of the tool and the tool may be centered on the reference point 34 while it rotates to remove material from the workpiece 10 in the area provided by the tool location 30. In alternative configurations, such as with milling tools for example, the tool may instead follow a two or three-dimensional path to remove material from the workpiece 10 along the tool path 30.

In the example provided, the bore 14 is offset from the intended bore 18 such that a portion 110 of the bore 14 is not within the area to be machined 30. Accordingly, when the machining process is complete, the finished feature (not shown) will not be exactly the intended shape and the portion 110 will remain a part of the finished feature which will still be a rough surface, e.g., a non-cleanup condition.

Figure 2:
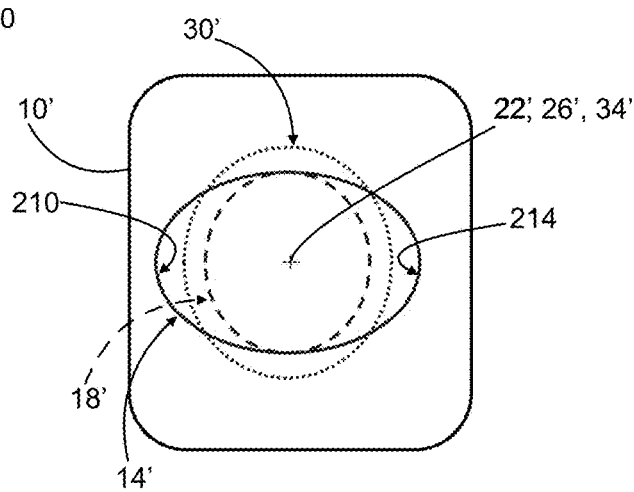
FIG. 2 is a top view of a workpiece illustrating a second example type of a non-cleanup condition.

Referring to FIG. 2, a workpiece 10' of a second configuration, is illustrated. The workpiece 10' is similar to workpiece 10 (FIG. 1). Similar features are illustrated with similar, but primed reference numerals. Accordingly, only differences are described in detail herein. The reference point 34' of the area to be machined 30', the intended center point 26' and the center point 22' are all coincident. In this example, one or more portions (e.g., portion 210 and portion 214) of the bore 14' extend outside the area to be machined 30'. Similar to the portion 110 of FIG. 1, the finished feature (not shown) will have rough surfaces (e.g., non-cleanup condition) at the portions 210, 214.

Figure 3:
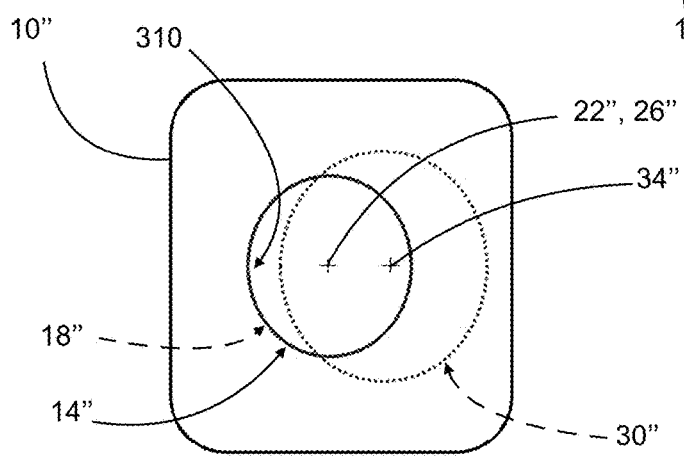
FIG. 3 is a top view of a workpiece illustrating a third example type of a non-cleanup condition.

Referring to FIG. 3, a workpiece 10" of a third configuration, is illustrated. The workpiece 10" is similar to workpiece 10 (FIG. 1. Similar features are illustrated with similar, but double primed reference numerals. Accordingly, only differences are described in detail herein. In the example provided, the bore 14" is coincident with the intended bore 18", but the area to be machined 30" is offset from the bore 14". Similar to the portion 110 of FIG. 1, the finished feature (not shown) will have a rough surface (e.g., non-cleanup condition) at a portion 310 where the area to be machined 30" does not include the bore 14".

The offsets noted above may occur for any number of reasons, such as from wear on the tool (not shown in FIGS. 1-3), wear within the machining device (not shown in FIGS. 1-3), error in programming the machining device, error in positioning the workpiece 10, 10', 10" in the machining device, etc.

While some non-limiting examples of non-cleanup conditions are illustrated with reference to FIGS. 1-3, other conditions may occur including combinations thereof. While non-cleanup conditions are illustrated and used as examples, the present disclosure can apply to other types of machining defects.

Figure 4:
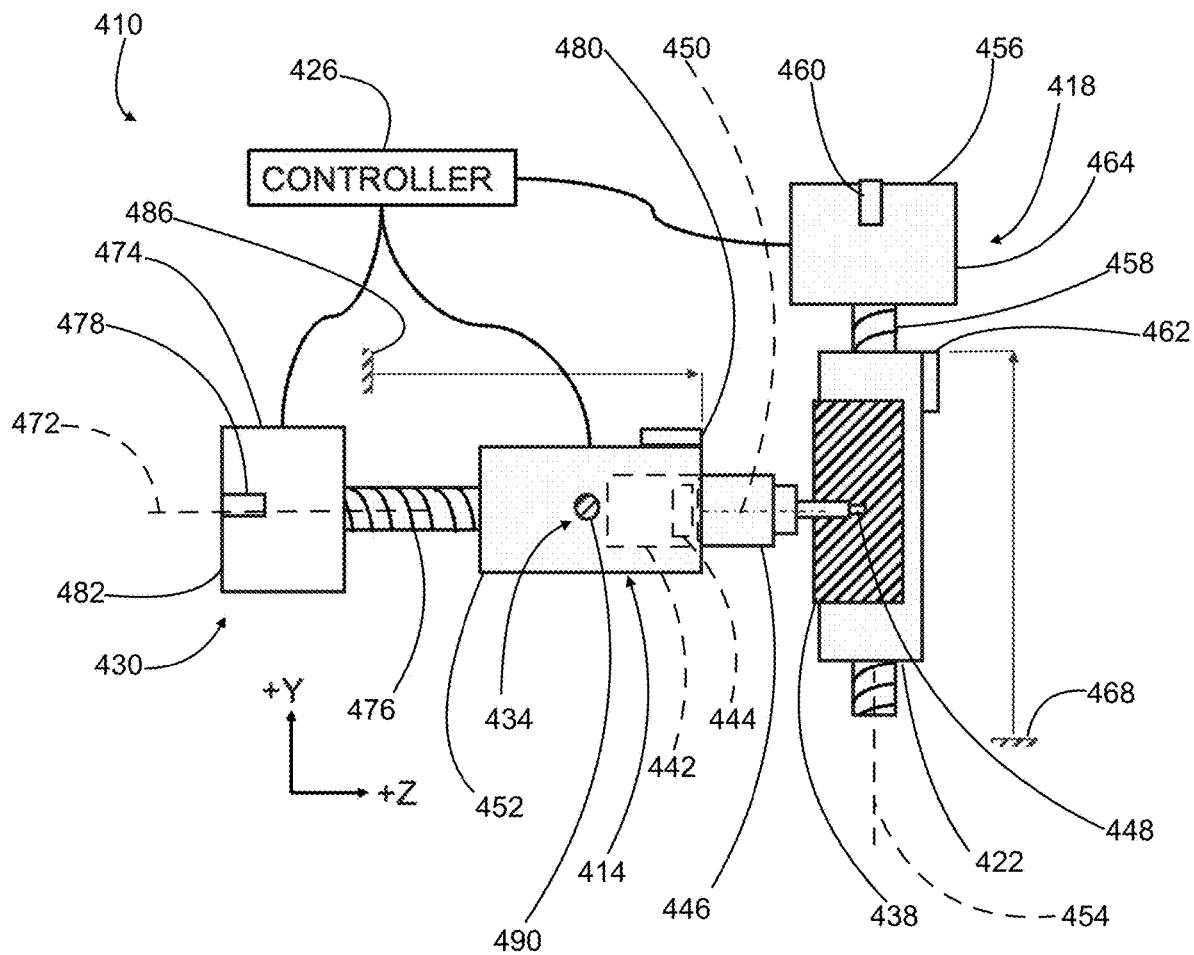
FIG. 4 is a schematic side view of a machining device in accordance with the teachings of the present disclosure, illustrating a cross-section of a workpiece.

Referring to FIG. 4 a machining device 410 is schematically illustrated. The machining device 410 includes a spindle 414, a first axis drive system 418, a workpiece support 422, and a controller 426. In the example provided, the machining device 410 also includes a second axis drive system 430 and a third axis drive system 434, though other configurations can be used.

The workpiece support 422 is configured to support a workpiece 438 to be machined by the machining device 410. The workpiece 438 can be any suitable workpiece and may be similar to the workpieces 10, 10', 10" (FIGS. 1-3). The spindle 414 includes a spindle motor 442, a spindle rotary encoder 444, and a tool holder 446. The tool holder 446 is configured to hold a tool 448 and rotate the tool 448 about a rotational axis 450 of the spindle 414. The tool 448 can be any suitable type of tool for removing material from the workpiece, such as a boring tool, a drill, a reamer, or a milling tool, for example.

The spindle motor 442 is drivingly coupled to the tool holder 446 and configured to rotate the tool holder 446 about the rotational axis 450 of the spindle 414. While not specifically shown, a gearbox such as a reduction gearset may drivingly couple the spindle motor 442 to the tool holder 446. The spindle rotary encoder 444 can be any suitable type of rotary encoder and is configured to detect a rotary position (i.e., angular position) about the rotational axis 450 of the spindle 414. For example, the spindle rotary encoder 444 can detect the angular position of an output shaft (not shown) of the spindle motor 442, a rotating component of the gearbox (not shown), or the angular position of the tool holder 446. In the example provided, the spindle rotary encoder 444 is disposed within a casing 452 of the spindle 414.

The first axis drive system 418 is configured to translate the workpiece support 422 along a first axis 454. In the example provided, the first axis 454 is the vertical axis and gravity acts downward (i.e., in the negative Y-direction) in FIG. 4, though other configurations can be used. In one alternative configuration, the first axis 454 is a horizontal axis and the first axis drive system 418 translates the workpiece support 422 horizontally.

In the example provided, the first axis drive system 418 includes a first motor 456, a first drive screw 458, a first rotary encoder 460, and a first linear encoder 462. The first motor 456 is drivingly coupled to the first drive screw 458 to rotate the first drive screw 458 about the first axis 454. In the example provided, the first motor 456 is a servo motor. A gearbox (not shown, e.g., a reduction gearset) may drivingly couple the first motor 456 to the first drive screw 458. The workpiece support 422 is drivingly coupled to the first drive screw 458 such that rotation of the first drive screw 458 translates the workpiece support 422 along the first axis 454. In the example provided, the first drive screw 458 is a ball screw, though other configurations can be used.

The first rotary encoder 460 can be any suitable type of rotary encoder and is configured to detect an angular position about the first axis 454 of the first drive screw 458. For example, the first rotary encoder 460 can detect the angular position of an output shaft (not shown) of the first motor 456, a rotating component of the gearbox (not shown), or the angular position of the first drive screw 458. In the example provided, the first rotary encoder 460 is disposed within a casing 464 of the first motor 456.

The first linear encoder 462 is configured to detect a linear position of the workpiece support 422 within the machining device 410. For example, the first linear encoder 462 can detect a linear distance of the workpiece support 422 relative to a first datum 468 of the machining device 410, the first datum being a known linear position which may be fixed within the machining device 410. In the example provided, the first linear encoder 462 is coupled to the workpiece support 422, though other configurations can be used.

The second axis drive system 430 is configured to translate the spindle 414 along a second axis 472. In the example provided, the second axis 472 is a horizontal axis such that movement along the second axis 472 translates the spindle 414 toward (i.e., in the positive Z-direction) and away from the workpiece 438, though other configurations can be used.

In the example provided, the second axis drive system 430 includes a second motor 474, a second drive screw 476, a second rotary encoder 478, and a second linear encoder 480. The second motor 474 is drivingly coupled to the second drive screw 476 to rotate the second drive screw 476 about the second axis 472. In the example provided, the second motor 474 is a servo motor. A gearbox (not shown, e.g., a reduction gearset) may drivingly couple the second motor 474 to the second drive screw 476. The spindle 414 is drivingly coupled to the second drive screw 476 such that rotation of the second drive screw 476 translates the spindle 414 along the second axis 472. In the example provided, the second drive screw 476 is a ball screw, though other configurations can be used.

The second rotary encoder 478 can be any suitable type of rotary encoder and is configured to detect an angular position about the second axis 472 of the second drive screw 476. For example, the second rotary encoder 478 can detect the angular position of an output shaft (not shown) of the second motor 474, a rotating component of the gearbox (not shown), or the angular position of the second drive screw 476. In the example provided, the second rotary encoder 478 is disposed within a casing 482 of the second motor 474.

The second linear encoder 480 is configured to detect a linear position of the spindle 414 within the machining device 410. For example, the second linear encoder 480 can detect a linear distance of the spindle 414 relative to a second datum 486 of the machining device 410, the second datum 486 being a known linear position which may be fixed within the machining device 410. In the example provided, the second linear encoder 480 is coupled to the spindle 414, though other configurations can be used.

The third axis drive system 434 is configured to translate the spindle 414 along a third axis (not specifically shown, but extending into and out of the page in the view illustrated in FIG. 4). In the example provided, the third axis is a horizontal axis such that movement along the third axis translates the spindle 414 horizontally (i.e., in the positive and negative X-directions, which are not shown but are perpendicular to the Y and Z directions) relative to the workpiece 438, though other configurations can be used.

In the example provided, the third axis drive system 434 includes a third motor (not shown), a third drive screw 490, a third rotary encoder (not shown), and a third linear encoder (not shown). The third axis drive system 434 can be similar to the second axis drive system 430 except that it moves the spindle in the X-directions (not specifically shown).

While the machining device 410 is described as being capable of moving the spindle 414 and workpiece 438 relative to each other along three linear axes and a rotary axis, other configurations can be used including more or fewer operational linear axes, and/or more rotational axes.

The controller 426 is connected to the spindle 414, the first axis drive system 418, the second axis drive system 430, and the third axis drive system 434 for electrical communication therewith. The controller 426 is configured to receive signals from the rotary encoders (e.g., 444, 460, 478) and the linear encoders (e.g., 462, 480). The controller 426 is also configured to control operation of the motors (e.g., 442, 456, 474) by controlling electrical power thereto.

Figure 5:
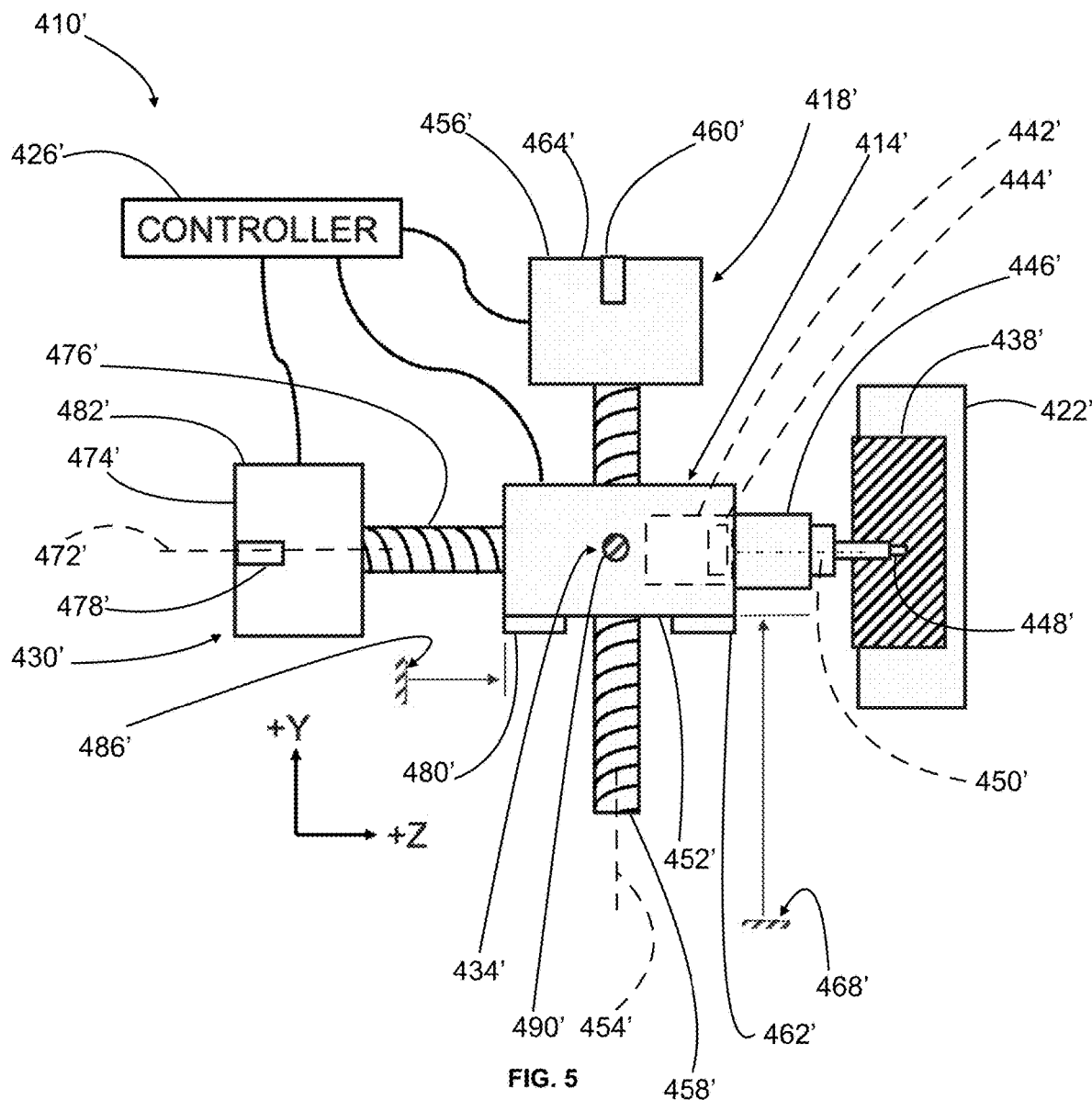
FIG. 5 is a schematic side view of a machining device of a second construction in accordance with the teachings of the present disclosure.

Referring to FIG. 5, a machining device 410' of a second construction is illustrated. The machining device 410' is similar to the machining device 410 (FIG. 4) except as otherwise shown and described herein. Features similar to those of machining device 410 (FIG. 4) are shown and described with similar but primed reference numerals. In the example provided, the first axis drive system 418' is configured to translate the spindle 414' along a first axis 454'. In the example provided, the first axis 454' is the vertical axis and gravity acts downward (i.e., in the negative Y-direction) in FIG. 5, though other configurations can be used. In one alternative configuration, the first axis 454' is a horizontal axis and the first axis drive system 418' translates the spindle 414' horizontally.

Accordingly, the first linear encoder 462' is configured to detect a linear position of the spindle 414' within the machining device 410'. For example, the first linear encoder 462' can detect a linear distance of the spindle 414' relative to the first datum 468' of the machining device 410', the first datum 468' being a known linear position which may be fixed within the machining device 410'. In the example provided, the first linear encoder 462' is coupled to the spindle 414', though other configurations can be used.

In an alternative configuration, not specifically shown, a workpiece holder can be translated along two or more axes by corresponding drive systems similar to the first, second, and/or third axis drive systems 418, 430, 434. In another alternative configuration, not specifically shown, the spindle can be configured to hold and rotate the workpiece while the tool is moved relative to the rotating workpiece by corresponding drive systems similar to the first, second, and/or third axis drive systems 418, 430, 434.

Figure 6:
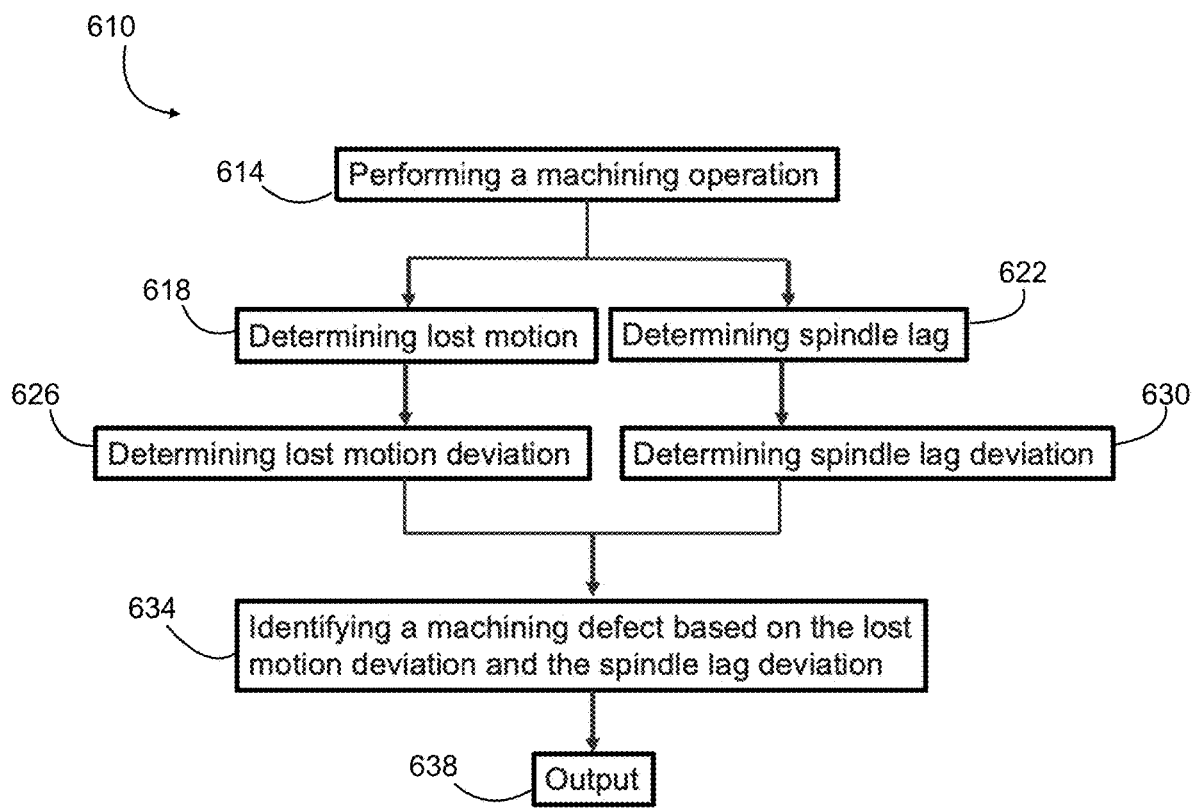
FIG. 6 is a flow chart of a method of operating a machining device in order to determine a machining defect in accordance with the teachings of the present disclosure.

Referring to FIG. 6, a method 610 of operating a machining device is illustrated. While described herein with reference to the machining device 410 (FIG. 4), the method 610 can be used with other machining devices including, but not limited to the machining device 410' (FIG. 5). At step 614, a machining operation is performed on the workpiece 438. The machining operation can be any type of machining operation, such as drilling, boring, reaming, tapping, cutting, or milling for example. At step 618, the controller 426 measures lost motion of the first axis drive system 418, the second axis drive system 430, and/or the third axis drive system 434 while performing the machining operation. The lost motion is the difference between the position detected by the linear encoder and position detected by the rotary encoder for the particular axis drive system. For example, the lost motion for the first axis drive system 418 is the difference between the linear position along the first axis 454 detected by the first linear encoder 462 and the expected linear position along the first axis 454 based on the angular position detected by the first rotary encoder 460. The controller 426 can calculate the expected linear position along the first axis 454 by using the angular position detected by the first rotary encoder 460 and predetermined parameters of the first axis drive system 418. For example, the controller 426 may include or be connected to a memory device (not specifically shown) that stores predetermined values that correlate the rotary position of the first rotary encoder 462 to an expected linear position. The predetermined values, for example, can be related to the expected geometry of components of the first axis drive 418 (e.g., the second motor 474, second drive screw 476). For example, the second drive screw 476 and the mating component (e.g., the workpiece support 422) can have a known expected thread pitch such that a particular rotational position correlates to an expected linear position.

At step 622, the controller 426 also determines the spindle lag. The spindle lag is the difference between the desired angular position of the spindle 414 and the actual angular position of the spindle 414. The desired angular position is the angular position based on a control signal sent by the controller 426 to the spindle motor 442 to rotate the spindle 414. The actual angular position is detected by the spindle rotary encoder 444.

Figure 7:
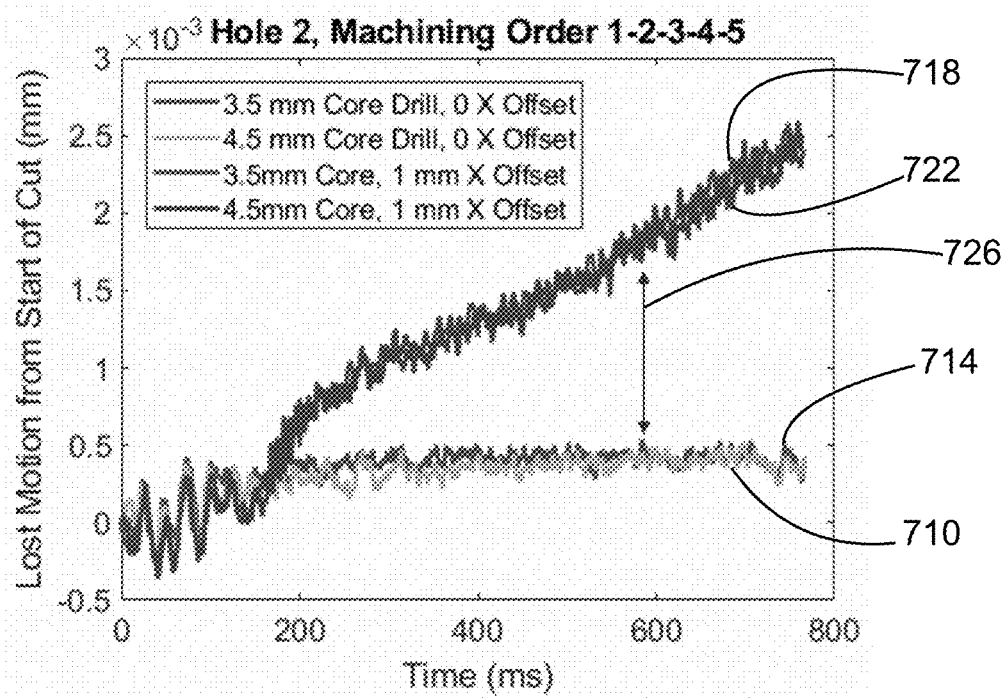
FIG. 7 is a graph of lost motion during an example machining operation in accordance with the teachings of the present disclosure.

At step 626, the controller 426 determines a deviation of the lost motion. The deviation may be the absolute amount of lost motion (i.e., the difference between the determined lost motion and zero lost motion) or may be a deviation from a different known or expected lost motion value. Referring to FIG. 7, an example of a determined lost motion in micrometers (μm) is plotted versus time in milliseconds (ms) during an example machining operation. In the example provided, the expected lost motion is illustrated by lines 710 and 714, which illustrate the lost motion that occurs during this particular machining operation without a machining defect. This is compared to the detected (i.e., actual) lost motion illustrated by lines 718 and 722, which illustrate the lost motion that occurs during this particular machining operation when a core shift of 1 mm occurs (e.g., a condition similar to as shown in FIG. 1). In the example provided, the machining operation was performed with two example core drill sizes: 3.5 mm and 4.5 mm. The lost motion deviation for the first example size (3.5 mm) is the difference between the line 718 and the line 710. The lost motion deviation for the second example size (4.5 mm) is the difference between the line 722 and the line 714. In the example provided, the lost motion deviation for both sizes are relatively similar and indicated by reference numeral 726.

Figure 8:
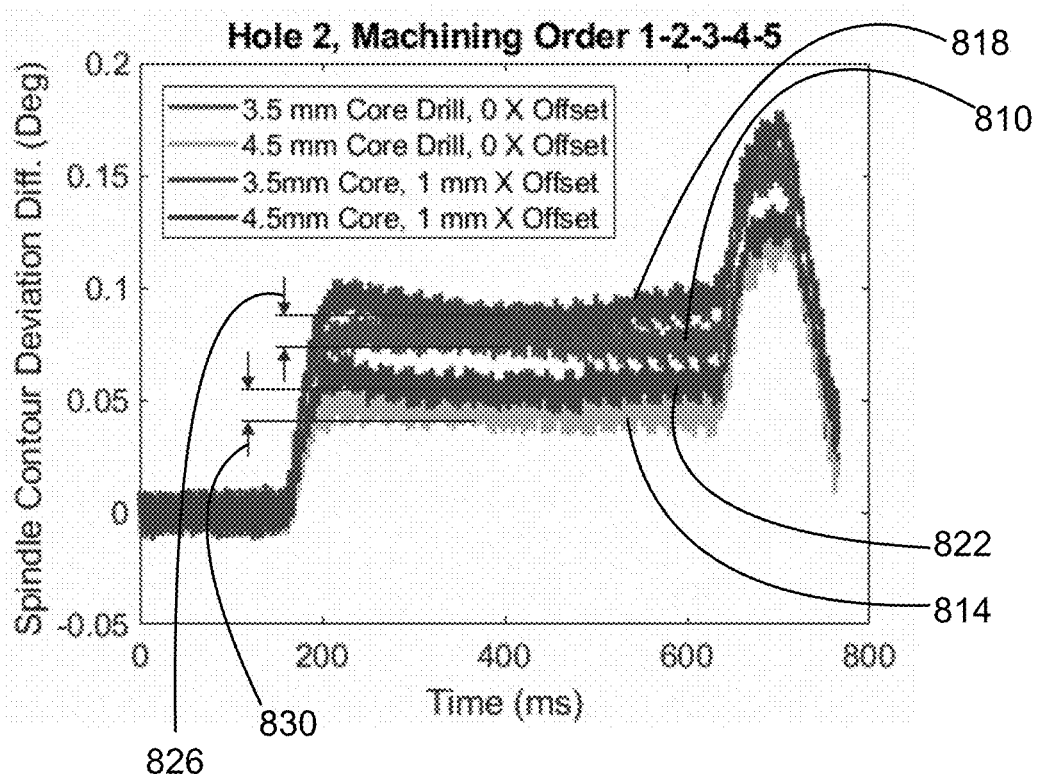
FIG. 8 is a graph of spindle lag during the example machining operation of FIG. 7 in accordance with the teachings of the present disclosure.

Returning to FIG. 6, at step 630, the controller 426 determines a deviation of the spindle lag. The deviation may be the absolute amount of spindle lag (i.e., the difference between the determined spindle lag and zero spindle lag) or may be a deviation from a different known or expected spindle lag value. Referring to FIG. 8, an example of a determined spindle lag (i.e., spindle contour deviation difference) in degrees is plotted versus time during the same example machining operation as was performed for the plot of FIG. 7. In the example provided, the expected spindle lag for the first size (3.5 mm) is illustrated by line 810 and the expected spindle lag for the second size (4.5 mm) is illustrated by line 814. The expected spindle lags 810, 814 illustrate the spindle lag that occurs during this particular machining operation without a machining defect. This is compared to the spindle lag illustrated by lines 818 and 822, which illustrate the detected (i.e., actual) spindle lag that occurs during this particular machining operation when the core shift of 1 mm occurs. The deviation for the first size (3.5 mm) is the difference between the line 818 and the line 810 and indicated by reference numeral 826. The deviation for the second size (4.5 mm) is the difference between the line 822 and the line 814 and indicated by reference numeral 830.

Returning to FIG. 6, at step 634, the controller identifies a machining defect based on coinciding lost motion deviation and spindle lag deviation. In the example provided by FIGS. 7 and 8, the lost motion deviation 726 is relatively high and is above a predetermined lost motion threshold (not specifically shown). In the example provided by FIGS. 7 and 8, the spindle lag deviation 826 or 830 is relatively low and is below a predetermined spindle lag threshold (not specifically shown). In the example provided, the machining defect is indicated when the lost motion deviation is greater than the predetermined lost motion threshold and the spindle lag deviation is less than the predetermined spindle lag threshold, though other configurations can be used that tie lost motion to coinciding spindle lag that represent a machining defect.

After a machining defect has been identified, at step 638, the controller 426 can perform an output function. The output function may include, without limitation, one or more of: stopping the machining operation, disabling the machine from performing subsequent machining operations, activating an indicator (e.g., visual indicator, light, error message, audio indicator, haptic indicator), creating a service ticket to schedule maintenance of the machining device 410, modifying a machining program, performing a calibration operation, or creating a log of the machining defect.

The machining device and method of the present disclosure provides for a more accurate determination that a machining defect has occurred than traditional process monitoring methods. The unique combination of using the lost motion coinciding with the spindle lag has improved signal to noise ratio over traditional process monitoring methods and does not require additional external sensors. Furthermore, the unique combination of lost motion coinciding with spindle lag provides linear sensitivity for motion in both vertical and horizontal axes.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of measuring quality in a machining operation of a device, the method comprising:
    measuring lost motion for at least one axis of the device during the machining operation;
    calculating a spindle lag of a spindle of the device during the machining operation;
    determining a lost motion deviation;
    determining a spindle lag deviation; and
    identifying a machining defect based on the lost motion deviation coinciding with the spindle lag deviation.

2. The method according to claim 1, wherein measuring the lost motion for the at least one axis includes:
    measuring a first linear encoder position;
    measuring a first rotary encoder position; and
    calculating a difference between the first linear encoder position and the first rotary encoder position.

3. The method according to claim 2 further comprising measuring an actual angular position of the spindle, wherein calculating the spindle lag includes comparing a desired angular position of the spindle to the actual angular position of the spindle.

4. The method according to claim 2, wherein the device includes a first motor configured to move the spindle relative to the workpiece along a first axis, and wherein the first linear encoder position is a position of the spindle along the first axis and the first rotary encoder position is an angular position of the first motor.

5. The method according to claim 2, wherein the device includes a first motor configured to move the workpiece relative to the device along a first axis, and wherein the first linear encoder position is a position of the workpiece along the first axis and the first rotary encoder position is an angular position of the first motor.

6. The method according to claim 1, wherein the machining defect is identified if the determined lost motion deviation is greater than a lost motion threshold and the spindle lag deviation is less than a spindle lag threshold.

7. The method according to claim 1, wherein measuring lost motion for the at least one axis includes measuring lost motion for a plurality of axes of the device during the machining operation.

8. The method according to claim 1, wherein the plurality of axes includes an X-axis, a Y-axis, and a Z-axis.

9. The method according to claim 1, wherein the machining operation is a clean-up operation performed on a workpiece.

10. The method according to claim 9, wherein the workpiece is a cast workpiece.

11. The method according to claim 9, wherein the workpiece is aluminum.

12. The method according to claim 1, wherein the machining operation is one of drilling, reaming or milling.

13. A method of measuring quality in a machining operation of a device including a spindle, the method comprising:
    performing a machining operation;
    measuring a first linear encoder position along a first axis during the machining operation;
    measuring a first rotary encoder position of a first motor during the machining operation, the first motor configured to move either the spindle or a workpiece along the first axis;
    calculating a difference between the first linear encoder position and the first rotary encoder position to determine a first axis lost motion;
    measuring an actual angular position of the spindle;
    comparing a desired angular position of the spindle to the actual angular position of the spindle to determine a spindle lag of a spindle; and
    identifying a machining defect based on a lost motion deviation coinciding with a spindle lag deviation.

14. The method according to claim 13, wherein the first motor is configured to move the spindle relative to the workpiece along the first axis, and wherein the first linear encoder position is a position of the spindle along the first axis.

15. The method according to claim 13, wherein the first motor is configured to move the workpiece relative to the device along the first axis, and wherein the first linear encoder position is a position of the workpiece along the first axis.

16. The method according to claim 13, wherein the machining defect is identified if the lost motion deviation is outside a predetermined lost motion range and the spindle lag deviation is outside a predetermined spindle lag range.

17. The method according to claim 13, wherein the machining operation is one of drilling, reaming, or milling.

18. A machining device comprising:
    a spindle configured to hold one of a tool or a workpiece;
    a spindle motor drivingly coupled to the spindle to rotate the spindle about a spindle axis;
    a first axis motor drivingly coupled to one of the spindle or a workpiece support and configured to move the one of the spindle or the workpiece support along a first linear axis; and
    a controller configured to identify a machining defect based on a first axis lost motion and a spindle lag, the first axis lost motion being lost motion along the first linear axis.

19. The machining device according to claim 18 further comprising:
    a spindle rotary encoder configured to detect a rotational position of the spindle;
    a first rotary encoder configured to detect a rotational position of the first axis motor;
    a first linear encoder configured to detect a position along the first linear axis of the one of the spindle or the workpiece support; and
    wherein the controller is connected for electrical communication with the spindle rotary encoder, the first rotary encoder, and the first linear encoder,
    wherein the controller is configured to calculate the first axis lost motion based on signals received from the first rotary encoder and the first linear encoder,
    wherein the controller is configured to calculate the spindle lag based on an expected rotary position and signals received from the spindle rotary encoder.

20. The machining device according to claim 19, wherein the first axis lost motion is a difference between the position detected by the first linear encoder and the rotational position detected by the first rotary encoder, and wherein the spindle lag is a difference between the rotational position detected by the spindle rotary encoder and a desired angular position of the spindle.

* * * * *